United States Patent
Kang

(10) Patent No.: US 8,948,711 B2
(45) Date of Patent: Feb. 3, 2015

(54) APPARATUS AND METHOD FOR DETERMINING DIELECTRIC ACCESS IN PORTABLE TERMINAL

(75) Inventor: Chang-Kyun Kang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 317 days.

(21) Appl. No.: 13/604,551

(22) Filed: Sep. 5, 2012

(65) Prior Publication Data

US 2013/0057252 A1 Mar. 7, 2013

(30) Foreign Application Priority Data

Sep. 5, 2011 (KR) ........................ 10-2011-0089421

(51) Int. Cl.
*H04B 1/04* (2006.01)
*H04B 17/00* (2006.01)
*H04W 52/28* (2009.01)

(52) U.S. Cl.
CPC .......... *H04B 17/003* (2013.01); *H04B 17/0032* (2013.01); *H04B 17/0035* (2013.01); *H04W 52/283* (2013.01)
USPC .................................... 455/114.1; 455/115.3

(58) Field of Classification Search
USPC ................................ 455/115.1, 114.1, 550.1
See application file for complete search history.

(56) References Cited

U.S. PATENT DOCUMENTS

| | | | |
|---|---|---|---|
| 7,499,722 B2 | 3/2009 | McDowell et al. | |
| 2003/0064761 A1* | 4/2003 | Nevermann | 455/572 |
| 2009/0143028 A1 | 6/2009 | Kim | |
| 2009/0305742 A1* | 12/2009 | Caballero et al. | 455/566 |

FOREIGN PATENT DOCUMENTS

KR 10-2011-0005561 1/2011

* cited by examiner

*Primary Examiner* — Tu X Nguyen

(57) ABSTRACT

An apparatus and method determine a dielectric access in a portable terminal. The method includes generating a TX signal of a specific frequency band by performing frequency conversion, modulation, and digital/analog conversion. The method also includes detecting the power of the TX signal and converting the detected power using Analog-to-Digital Conversion (ADC). The method further includes loading an ADC table defining values for determining the approach/withdrawal of a dielectric to/from the portable terminal, and comparing the power of the TX signal and the ADC table to determine the approach/withdrawal of a dielectric to/from the portable terminal.

20 Claims, 4 Drawing Sheets

APPARATUS AND METHOD FOR DETERMINING DIELECTRIC ACCESS IN PORTABLE TERMINAL

CROSS-REFERENCE TO RELATED APPLICATION(S) AND CLAIM OF PRIORITY

The present application is related to and claims priority under 35 U.S.C. §119 to an application filed in the Korean Intellectual Property Office on Sep. 5, 2011 and assigned Serial No. 10-2011-0089421, the contents of which are incorporated herein by reference.

TECHNICAL FIELD OF THE INVENTION

The present disclosure relates generally to an apparatus and method for determining a dielectric access in a portable terminal.

BACKGROUND OF THE INVENTION

Recently, portable terminals are being widely used as useful articles of modern persons without distinction of age and sex, and service providers and terminal manufacturers are competitively developing products (and services) for differentiation from other competitors.

For example, portable terminals are evolving into multimedia devices to provide various services such as phone books, games, Short Message Service (SMS), electronic mail (e-mail), wake-up calls, MPEG-1 Audio Layer 3 (MP3), schedule managing functions, digital cameras, and wireless Internet services.

Recently, since it has been suggested that electromagnetic waves generated by portable terminals may affect human bodies, terminal manufacturers are considering a counterplan for controlling the absorption of electromagnetic waves by users.

For example, a portable terminal controls the strength of transmission (TX) power to reduce an electromagnetic wave absorptance.

When a human body accesses (approaches) a portable terminal, the portable terminal reduces the TX power to reduce the absorption of electromagnetic waves by the human body.

In order to perform the above operation, the portable terminal has a proximity sensor and uses a sensing value to determine whether the human body has approached the portable terminal.

In order to reduce the power consumption of a portable terminal, a proximity sensor may be used to determine whether the portable terminal is in a call state. This method also uses a proximity sensor to determine the approach of a human body to a portable terminal.

A portable terminal size decreases for portability. However, when a portable terminal has a proximity sensor, there may be a limit in reducing the size of the portable terminal.

Also, when a portable terminal has a proximity sensor, the unit production cost of the portable terminal increases.

What is therefore required is an apparatus and method for determining the approach of a human body in a portable terminal without using a proximity sensor.

SUMMARY OF THE INVENTION

To address the above-discussed deficiencies of the prior art, it is a primary object to provide at least the advantages below.

Accordingly, an aspect of the present disclosure is to provide an apparatus and method for determining a dielectric access in a portable terminal.

Another aspect of the present disclosure is to provide an apparatus and method for determining a dielectric access in a portable terminal even without using a separate sensing device such as a proximity sensor.

Another aspect of the present disclosure is to provide an apparatus and method for determining a dielectric access in a portable terminal by using an Analog-to-Digital Conversion (ADC) value of the strength of a TX signal varying according to the antenna impedance.

Another aspect of the present disclosure is to provide an apparatus and method for reducing the absorptance of electromagnetic waves by a human body in a portable terminal by using an ADC value of the strength of a TX signal that varies according to the antenna impedance.

According to an aspect of the present disclosure, an apparatus for determining a dielectric access in a portable terminal is provided. The apparatus includes a TX signal processing unit configured to generate a TX signal of a specific frequency band by performing frequency conversion, modulation, and digital/analog conversion. The apparatus also includes a power detecting unit configured to detect the power of the TX signal and convert the detected power using ADC. The apparatus further includes a dielectric access determining unit configured to load an ADC table defining values for determining the approach/withdrawal of a dielectric to/from the portable terminal, and compare the power of the TX signal and the ADC table to determine the approach/withdrawal of a dielectric to/from the portable terminal.

According to another aspect of the present disclosure, a method for determining a dielectric access in a portable terminal is provided. The method includes detecting the power of a TX signal and converting the detected power using ADC. The method also includes loading an ADC table defining values for determining the approach/withdrawal of a dielectric to/from the portable terminal. The method further includes comparing the power of the TX signal and the ADC table to determine the approach/withdrawal of a dielectric to/from the portable terminal.

According to an aspect of the present disclosure, a portable terminal is provided. The portable terminal includes a display and an apparatus configured to determine a dielectric access, the apparatus comprising: a transmission (TX) signal processing unit configured to generate a TX signal of a specific frequency band by performing frequency conversion, modulation, and digital/analog conversion; a power detecting unit configured to detect the power of the TX signal and convert the detected power using an Analog-to-Digital Conversion (ADC); and a dielectric access determining unit configured to load an ADC table that defines values for determining the approach/withdrawal of a dielectric to/from the portable terminal, and compare the power of the TX signal and the ADC table to determine the approach/withdrawal of a dielectric to/from the portable terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 4B, discussed below, and the various embodiments used to describe the principles of the present disclosure in this patent document are by way of illustration only and should not be construed in any way to limit the scope of the disclosure.

Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure.

The present disclosure provides a scheme for determining a dielectric access by using an Analog-to-Digital Conversion (ADC) value of the strength of a TX signal. The present disclosure provides an apparatus and method for determining a dielectric access in a portable terminal by using an ADC value of the strength of a TX signal that varies according to the antenna impedance.

Figure 1:
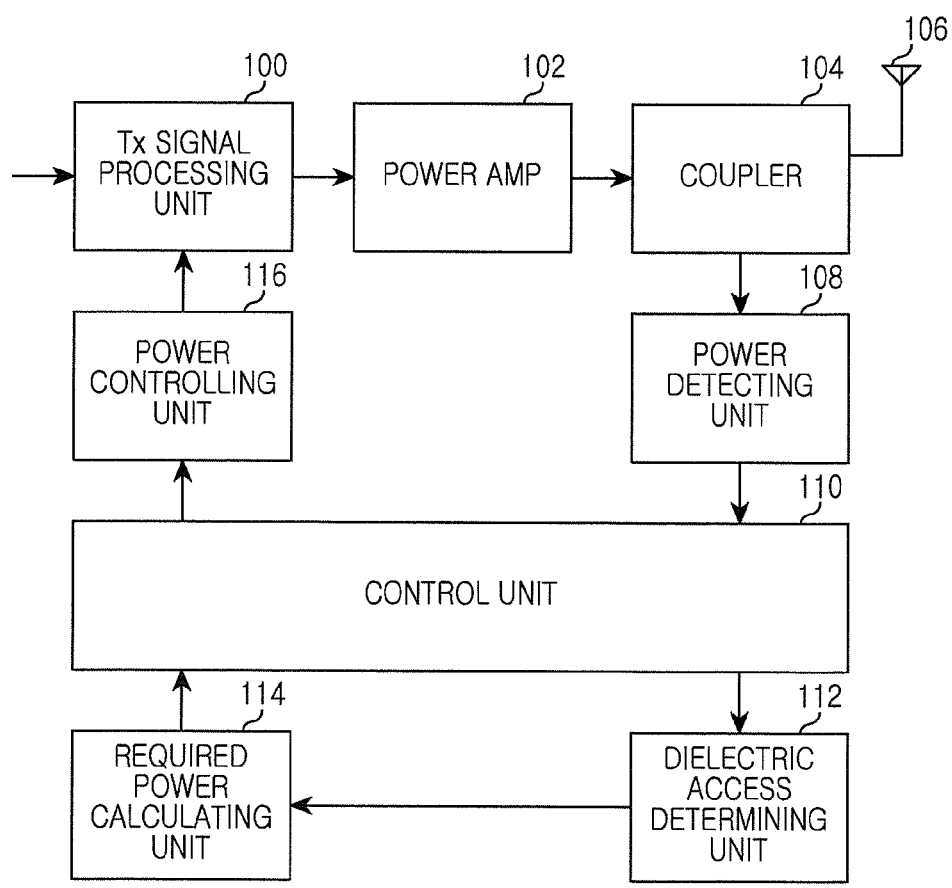
FIG. 1 illustrates a portable terminal for determining a dielectric access in a portable terminal by using an Analog-to-Digital Conversion (ADC) value of the strength of a TX signal, which varies according to the antenna impedance, according to the present disclosure.

FIG. 1 illustrates a portable terminal for determining a dielectric access in a portable terminal by using an ADC value of the strength of a TX signal that varies according to the antenna impedance, according to the present disclosure.

Referring to FIG. 1, the portable terminal may include a TX signal processing unit 100, a power amplifying unit 102, a coupler 104, an antenna 106, a power detecting unit 108, a control unit 110, a dielectric access determining unit 112, a required power calculating unit 114, and a power controlling unit 116.

The TX signal processing unit 100 generates a TX signal of a specific frequency band by performing frequency conversion, modulation, and digital/analog conversion according to the mobile communication standards.

The power amplifying unit 102 amplifies the TX signal, outputted from the TX signal processing unit 100, at a high power level for wireless transmission and outputs the amplified signal through the antenna 106. The coupler 104 is disposed between the power amplifying unit 102 and the antenna 106 to couple the TX signal, outputted from the TX signal processing unit 100, and feed back the resulting signal to the power detecting unit 108.

The power detecting unit 108 receives a feedback of the TX signal coupled by the coupler 104, detects the strength thereof, converts the TX signal through an ADC converter, and provides the resulting value to the control unit 110.

The strength of the TX signal detected by the power detecting unit 108 varies according to the antenna impedance.

Also, the power detecting unit 108 receives a feedback of a reflected signal coupled by the coupler 104, detects the reflected signal, converts the signal through an ADC converter, and provides the resulting value to the control unit 110.

That is, the power detecting unit 108 detects the strength of the TX signal or the strength of the reflected signal, and provides the resulting value to the control unit 110 for detection of the approach of a dielectric.

The control unit 110 controls an overall operation of the portable terminal. For example, the control unit 110 processes and controls voice communication and data communication. In addition to the general functions, according to the present disclosure, the control unit 110 determines the approach of a dielectric by using the strength of the TX signal received from the power detecting unit 108. That is, the control unit 110 determines the approach of a dielectric by using the strength of the TX signal that varies according to the antenna impedance.

Also, the control unit 110 determines the approach of a dielectric by using the strength of the reflected signal received from the power detecting unit 108.

Also, the control unit 110 controls the TX power according to whether a dielectric has approached the portable terminal.

Under the control of the control unit 110, the dielectric access determining unit 112 determines the approach of a dielectric to the portable terminal.

The dielectric access determining unit 112 may determine the approach of a dielectric to the portable terminal by comparing a prestored ADC table and the strength of the TX signal measured by the power detecting unit 108 or by comparing the prestored ADC table and the strength of the reflected signal.

Under the control of the control unit 110, the required power calculating unit 114 calculates the TX power that is to be changed according to the approach of a dielectric to the portable terminal.

That is, upon detecting the approach of a dielectric to the portable terminal, the required power calculating unit 114 calculates the TX power capable of reducing the absorptance of electromagnetic waves absorbed by a human body.

Also, upon detecting the withdrawal (i.e., movement away) of a dielectric from the portable terminal, the required power calculating unit 114 detects the TX power prior to change.

Under the control of the control unit 110, the power controlling unit 116 changes the TX power to the power value calculated by the required power calculating unit 114. That is, the power controlling unit 116 decreases the strength of the TX power or increases the same to the original strength according to the value calculated by the required power calculating unit 114.

The above configurations should be considered in descriptive sense only and not for the purpose of limitation, and those skilled in the art will understand that various changes may be made therein without departing from the scope of the present disclosure. For example, although separate units, such as the dielectric access determining unit 112 and the required power calculating unit 114, are provided for respective functions of the control unit 110, the control unit 110 may be configured to perform all or some of the respective functions on behalf of such separate units.

The method described hereunder of the present invention may be provided as one or more instructions in one or more software modules stored in a storage device. The software modules may be executed by the control unit 110.

Figure 2:
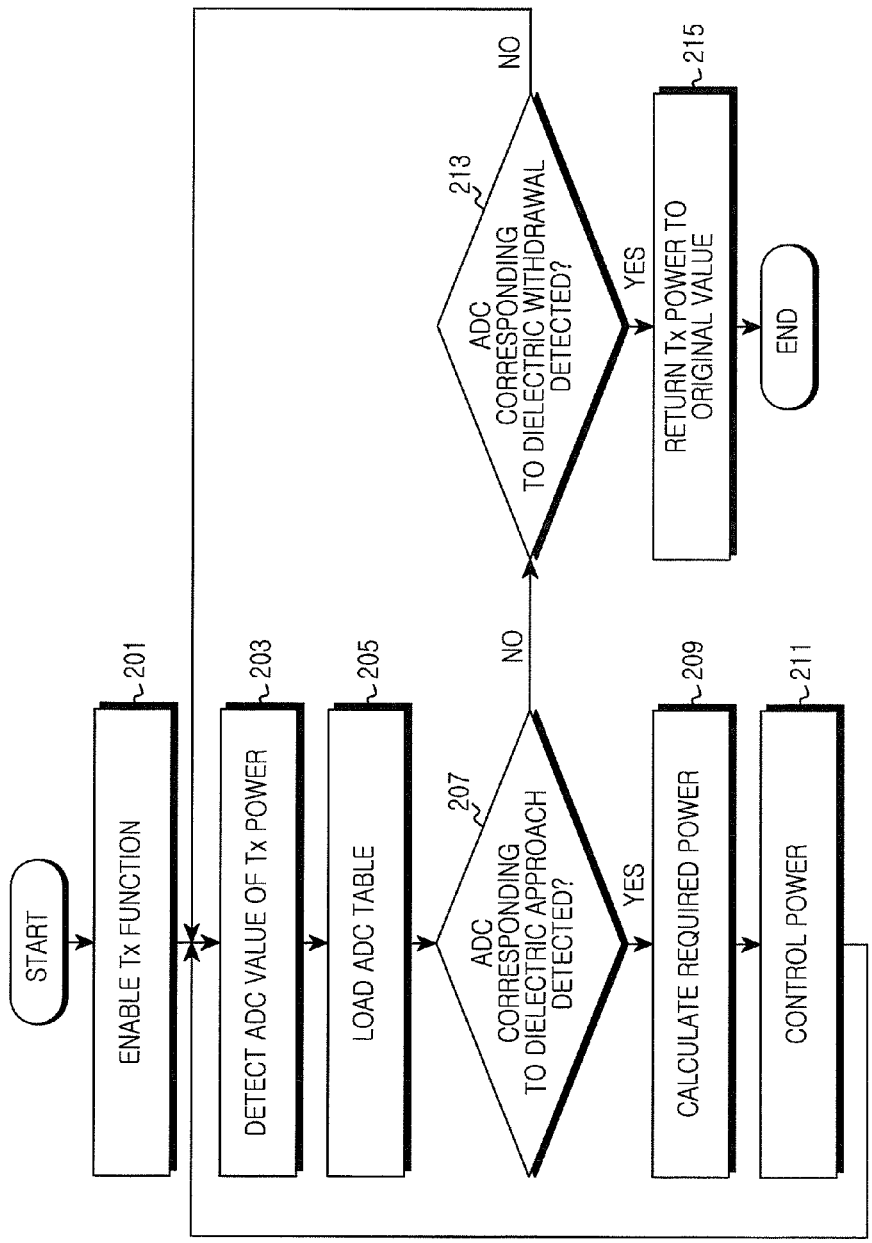
FIG. 2 illustrates a process of controlling a TX power in a portable terminal according to the present disclosure.

FIG. 2 illustrates a process of controlling a TX power in a portable terminal according to the present disclosure.

Referring to FIG. 2, in block 201, the portable terminal enables a TX function and transmits a TX signal through an antenna. In block 203, the portable terminal detects an ADC value of the TX power. Herein, the ADC value of the TX power is an ADC value of the TX power, which varies according to the antenna impedance.

In block 205, the portable terminal loads an ADC table. Herein, the ADC table contains the measurements of each TX power inputted through a power amplifier unit to a coupler. Also, in the present disclosure, values for determining the approach/withdrawal of a dielectric to the portable terminal are included in the ADC table, which may be defined as Table 1 below.

TABLE 1

| TX PWR | ADC CON-DUCTION | ADC VALUE (FREE SPACE) | ADC VALUE (DIELECTRIC ACCESS) |
|---|---|---|---|
| 24 | 300 | 310 | 340 |
| 23 | 280 | 290 | 300 |
| 22 | 260 | 270 | 280 |
| 21 | 240 | 260 | 265 |

For example, when the strength of the TX signal (TX PWR) is 24 dB, the portable terminal uses a power detecting unit to periodically detect the strength of the TX signal and controls the strength of the TX signal to cause the ADC value to maintain 300 dBm (ADC conduction).

That is, when the strength of the TX power is 24 dB, the portable terminal may store an ADC table defining that the ADC value of the TX signal is 300 dBm, the ADC value to be measured in the state of a dielectric withdrawal is 310 dBm, and the ADC value to be measured in the state of a dielectric approach is 340 dBm.

When the power detecting unit detects that the strength of the TX signal is 310 dBm, the portable terminal may determine no approach of a dielectric to the portable terminal.

Also, when the power detecting unit detects that the strength of the TX signal is 340 dBm, the portable terminal may determine the approach of a dielectric to the portable terminal, and decrease the strength of the TX signal.

That is, the portable terminal according to the present disclosure determines the approach of a dielectric thereto by using the power of the TX signal that varies according to the antenna impedance.

In block 207, the portable terminal determines whether the ADC value corresponding to a dielectric approach is detected. That is, the portable terminal determines whether the ADC value of the TX power detected in block 203 is within the ADC table value corresponding to a dielectric approach.

When the ADC value corresponding to a dielectric approach is detected (in block 207), the portable terminal proceeds to block 209. In block 209, the portable terminal calculates a required power. Herein, the required power is an estimated value of the strength of the TX power to be decreased to detect the ADC value corresponding to a dielectric withdrawal.

In block 211, the portable terminal controls the TX power by using the required power calculated in block 209. Thereafter, the portable terminal returns to block 203.

Alternatively, when the ADC value corresponding to a dielectric approach is not detected (in block 207), the portable terminal proceeds to block 213. In block 213, the portable terminal determines whether the ADC value corresponding to a dielectric withdrawal is detected.

When the ADC value corresponding to a dielectric withdrawal is not detected (in block 213), the portable terminal maintains a predetermined TX power strength and returns to block 203.

Alternatively, when the ADC value corresponding to a dielectric withdrawal is detected (in block 213), the portable terminal proceeds to block 215. In block 215, the portable terminal returns the TX power to the original value and uses the required power to maintain the TX power prior to change.

Thereafter, the portable terminal ends the present algorithm.

Figure 3A:
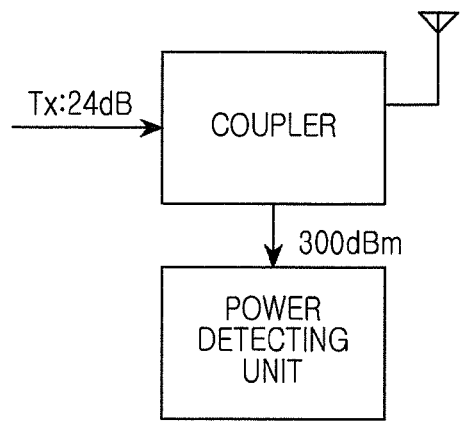
FIGS. 3A through 3C illustrate a process of determining a dielectric access in a portable terminal according to an embodiment of the present disclosure.
Figure 3B:
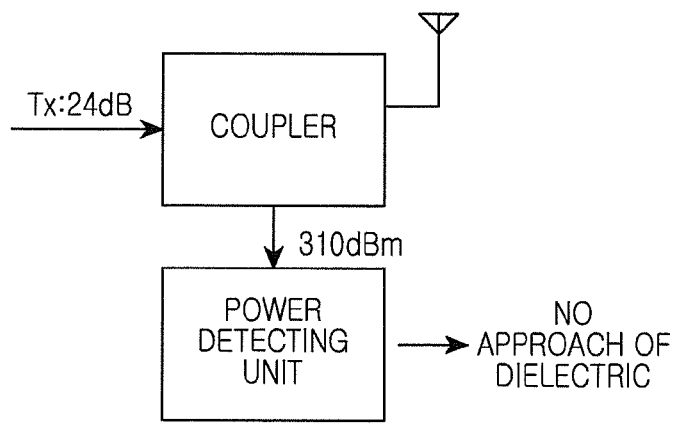
Figure 3C:
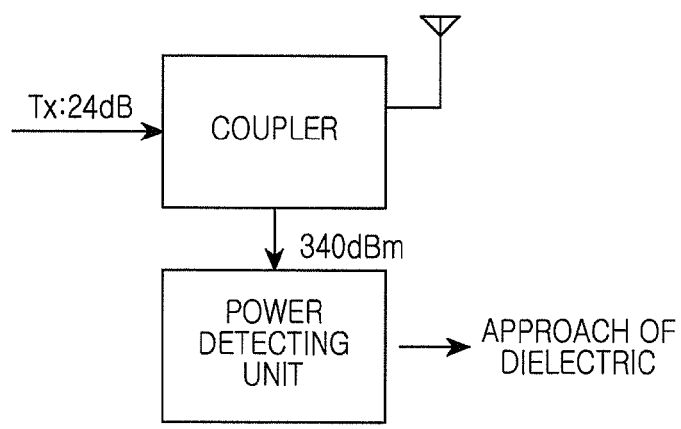

FIGS. 3A through 3C illustrate a process of determining a dielectric access in a portable terminal according to an embodiment of the present disclosure.

Referring to FIGS. 3A through 3C, the portable terminal may use a coupler and a power detecting unit to determine the approach of a dielectric thereto.

The coupler receives a TX signal amplified by a power amplifying unit, and samples the TX signal. The power detecting unit measures the power of the TX signal sampled by the coupler. The power of the TX signal measured by the power detecting unit is converted by an ADC converter, and the result is used to control the TX power.

In general, the power of the TX signal detected by the power detecting unit varies according to the antenna impedance. A predetermined ADC value for each TX signal is used to maintain the strength of the TX power.

For example, when the strength of the TX power is 24 dB, the portable terminal may store an ADC table defining that the ADC value of the TX signal is 300 dBm, the ADC value to be measured in the state of a dielectric withdrawal is 310 dBm, and the ADC value to be measured in the state of a dielectric approach is 340 dBm.

Accordingly, as illustrated in FIG. 3A, the portable terminal periodically detects the strength of the TX signal through the power detecting unit, and maintains the strength of the TX signal to cause the ADC value to be 300 dBm.

As illustrated in FIG. 3B, when the ADC value is detected as 310 dBm by the power detecting unit, the portable terminal may determine no approach of a dielectric to the portable terminal.

In contrast, as illustrated in FIG. 3C, when the ADC value is detected as 340 dBm by the power detecting unit, the portable terminal may determine the approach of a dielectric to the portable terminal.

The present disclosure determines the approach of a dielectric to the portable terminal by using the ADC value varying according to the antenna impedance, thus making it possible to determine the approach of a dielectric to the portable terminal even without using a proximity sensor.

Accordingly, the present disclosure controls the strength of the TX signal by using the ADC value varying according to the antenna impedance, thereby making it possible to reduce the absorptance of electromagnetic waves absorbed by a human body.

Also, the present disclosure may determine the approach of a human body to the portable terminal by using the ADC value varying according to the antenna impedance, and may control an operation of the portable terminal accordingly. For example, because a human body may approach the portable terminal in a call state, the present disclosure may end operations of unnecessary modules (e.g., an LCD and a wireless LAN) to reduce battery power consumption.

Figure 4A:
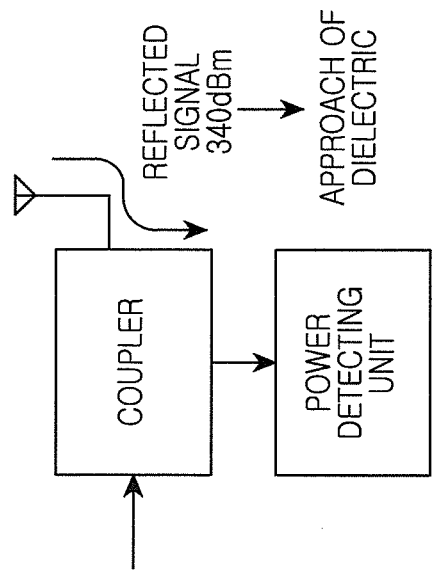
FIGS. 4A and 4B illustrate a process of determining a dielectric access in a portable terminal according to another embodiment of the present disclosure.
Figure 4B:
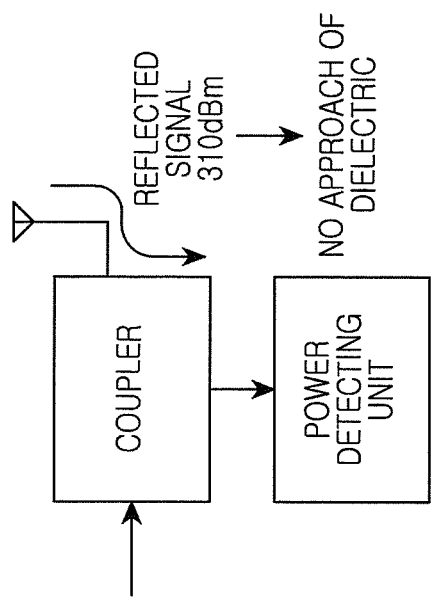

FIGS. 4A and 4B illustrate a process of determining a dielectric access in a portable terminal according to another embodiment of the present disclosure.

Referring to FIGS. 4A and 4B, the portable terminal may use a coupler and a power detecting unit to determine the approach of a dielectric thereto.

The coupler receives a TX signal amplified by a power amplifying unit, and samples the TX signal. The power detecting unit measures the power of the TX signal sampled by the coupler. The power of the TX signal measured by the power detecting unit is converted by an ADC converter, and the result is used to control the TX power.

The strength of a signal reflected from an antenna varies due to an object approaching the antenna. The portable terminal uses a predetermined ADC value for each reflected signal to change the strength of the TX power.

For example, the portable terminal may store an ADC table defining that the strength of the reflected signal to be measured in the state of no dielectric approach is 310 dBm, and the strength of the reflected signal to be measured in the state of a dielectric approach is 340 dBm.

Accordingly, as shown in FIG. 4A, when the ADC value is detected as 310 dBm by the power detecting unit, the portable terminal may determine no approach of a dielectric to the portable terminal.

In contrast, as shown in FIG. 4B, when the ADC value is detected as 340 dBm by the power detecting unit, the portable terminal may determine the approach of a dielectric to the portable terminal.

The present disclosure determines the approach of a dielectric to the portable terminal by using the ADC value of a signal reflected from the antenna, thus making it possible to determine the approach of a dielectric to the portable terminal without using a proximity sensor.

Accordingly, the present disclosure controls the strength of the TX signal by using the ADC value of a signal reflected from the antenna, thereby making it possible to reduce the absorptance of electromagnetic waves absorbed by a human body.

Also, the present disclosure may determine the approach of a human body to the portable terminal by using the ADC value of a signal reflected from the antenna, and may control an operation of the portable terminal accordingly. For example, because a human body may approach the portable terminal in a call state, the present disclosure may end operations of unnecessary modules (e.g., an LCD and a wireless LAN) to reduce battery power consumption.

As described above, the portable terminal according to the present disclosure can determine a dielectric access by using an ADC value of the strength of a TX signal varying according to the antenna impedance, even without using a separate sensing device such as a proximity sensor.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present disclosure.

What is claimed is:

1. An apparatus for determining a dielectric access in a portable terminal, comprising:
    a transmission (TX) signal processing unit configured to generate a TX signal of a specific frequency band by performing frequency conversion, modulation, and digital/analog conversion;
    a power detecting unit configured to detect the power of the TX signal and convert the detected power using an Analog-to-Digital Conversion (ADC); and
    a dielectric access determining unit configured to load an ADC table that defines values for determining the approach/withdrawal of a dielectric to/from the portable terminal, and compare the power of the TX signal and the ADC table to determine the approach/withdrawal of a dielectric to/from the portable terminal.

2. The apparatus of claim 1, wherein the power detecting unit is configured to detect the power of the TX signal by using at least one of the strength of the TX signal which varies according to the antenna impedance and the strength of a signal reflected from an antenna.

3. The apparatus of claim 1, further comprising:
    a required power calculating unit configured to calculate a required power when the approach of a dielectric to the portable terminal is detected; and
    a power controlling unit configured to decrease the strength of the TX signal by using the required power calculated by the required power calculating unit,
    wherein the required power is an estimated value of the strength of the TX power to be decreased to detect an ADC value corresponding to the withdrawal of a dielectric from the portable terminal.

4. The apparatus of claim 3, wherein the power controlling unit is configured to return the strength of the TX signal to the original value when the withdrawal of a dielectric from the portable terminal is detected.

5. The apparatus of claim 1, further comprising:
    a control unit configured to determine, upon detecting the approach of a dielectric to the portable terminal, that the portable terminal is in a call state, and stop an operation of a function causing unnecessary power consumption,
    wherein the function causing unnecessary power consumption is a function unnecessary for a call function, including at least one of LCD light emission, key button light emission, and a wireless LAN.

6. The apparatus of claim 3, wherein the power detecting unit is configured to detect the power of the TX signal by using at least one of the strength of the TX signal which varies according to the antenna impedance and the strength of a signal reflected from an antenna.

7. The apparatus of claim 1, further comprising:
a power amplifying unit configured to amplify the TX signal outputted from the TX signal processing unit.

8. A method for determining a dielectric access in a portable terminal, comprising:
detecting the power of a transmission (TX) signal and converting the detected power using an Analog-to-Digital Conversion (ADC);
loading an ADC table that defines values for determining the approach/withdrawal of a dielectric to/from the portable terminal; and
comparing the power of the TX signal and the ADC table to determine the approach/withdrawal of a dielectric to/from the portable terminal.

9. The method of claim 8, wherein detecting the power of the TX signal and converting the detected power comprises:
detecting the power of the TX signal by using at least one of the strength of the TX signal which varies according to the antenna impedance and the strength of a signal reflected from an antenna.

10. The method of claim 8, further comprising:
calculating a required power when the approach of a dielectric to the portable terminal is detected; and
decreasing the strength of the TX signal by using the calculated required power,
wherein the required power is an estimated value of the strength of the TX power to be decreased to detect an ADC value corresponding to the withdrawal of a dielectric from the portable terminal.

11. The method of claim 10, further comprising:
returning the strength of the TX signal to the original value when the withdrawal of a dielectric from the portable terminal is detected.

12. The method of claim 8, further comprising:
determining, upon detecting the approach of a dielectric to the portable terminal, that the portable terminal is in a call state, and stopping an operation of a function causing unnecessary power consumption,
wherein the function causing unnecessary power consumption is a function unnecessary for a call function, including at least one of LCD light emission, key button light emission, and a wireless LAN.

13. The method of claim 10, wherein detecting the power of the TX signal and converting the detected power comprises:
detecting the power of the TX signal by using at least one of the strength of the TX signal which varies according to the antenna impedance and the strength of a signal reflected from an antenna.

14. The method of claim 8, further comprising amplifying the TX signal.

15. A portable terminal, comprising:
a display; and
an apparatus configured to determine a dielectric access, the apparatus comprising:
a transmission (TX) signal processing unit configured to generate a TX signal of a specific frequency band by performing frequency conversion, modulation, and digital/analog conversion;
a power detecting unit configured to detect the power of the TX signal and convert the detected power using an Analog-to-Digital Conversion (ADC); and
a dielectric access determining unit configured to load an ADC table that defines values for determining the approach/withdrawal of a dielectric to/from the portable terminal, and compare the power of the TX signal and the ADC table to determine the approach/withdrawal of a dielectric to/from the portable terminal.

16. The portable terminal of claim 15, wherein the power detecting unit is configured to detect the power of the TX signal by using at least one of the strength of the TX signal which varies according to the antenna impedance and the strength of a signal reflected from an antenna.

17. The portable terminal of claim 15, the apparatus further comprising:
a required power calculating unit configured to calculate a required power when the approach of a dielectric to the portable terminal is detected; and
a power controlling unit configured to decrease the strength of the TX signal by using the required power calculated by the required power calculating unit,
wherein the required power is an estimated value of the strength of the TX power to be decreased to detect an ADC value corresponding to the withdrawal of a dielectric from the portable terminal.

18. The portable terminal of claim 17, wherein the power controlling unit is configured to return the strength of the TX signal to the original value when the withdrawal of a dielectric from the portable terminal is detected.

19. The portable terminal of claim 15, the apparatus further comprising:
a control unit configured to determine, upon detecting the approach of a dielectric to the portable terminal, that the portable terminal is in a call state, and stop an operation of a function causing unnecessary power consumption,
wherein the function causing unnecessary power consumption is a function unnecessary for a call function, including at least one of LCD light emission, key button light emission, and a wireless LAN.

20. The portable terminal of claim 17, wherein the power detecting unit is configured to detect the power of the TX signal by using at least one of the strength of the TX signal which varies according to the antenna impedance and the strength of a signal reflected from an antenna.

* * * * *